United States Patent
Takahashi

(10) Patent No.: US 11,423,316 B2
(45) Date of Patent: Aug. 23, 2022

(54) PREDICTION METHOD, PREDICTION APPARATUS, AND STORAGE MEDIUM STORING COMPUTER PROGRAM

(71) Applicant: BROTHER KOGYO KABUSHIKI KAISHA, Nagoya (JP)

(72) Inventor: Eisuke Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 851 days.

(21) Appl. No.: 16/284,245

(22) Filed: Feb. 25, 2019

(65) Prior Publication Data
US 2019/0303767 A1    Oct. 3, 2019

(30) Foreign Application Priority Data
Mar. 29, 2018   (JP) .............................. JP2018-065348

(51) Int. Cl.
*B60T 7/12*      (2006.01)
*G06N 5/02*    (2006.01)
(Continued)

(52) U.S. Cl.
CPC ............. *G06N 5/02* (2013.01); *G05B 13/048* (2013.01); *G06F 17/11* (2013.01)

(58) Field of Classification Search
CPC .................. G06F 30/12; G06F 2111/00; G06F 2119/22; G06F 30/20
See application file for complete search history.

(56) References Cited

U.S. PATENT DOCUMENTS

2007/0233352 A1* 10/2007 Miyashita ............. B60W 40/12
                                                                    701/82
2017/0090444 A1    3/2017 Takahashi
(Continued)

FOREIGN PATENT DOCUMENTS

JP    2009-175917 A    8/2009
JP    2015-018388 A    1/2015
(Continued)

OTHER PUBLICATIONS

Official Action dated Jan. 11, 2022 received from the Japanese Patent Office in related JP patent application 2018-065348 together with English translation.

*Primary Examiner* — John Kwon
(74) *Attorney, Agent, or Firm* — Scully, Scott, Murphy & Presser, PC

(57) ABSTRACT

A prediction method includes: acquiring time-series data of sets of a control input um and a control output ym as a sample of a control input u and a control output y; calculating, based on the time-series data, a value $\rho^*$ that minimizes a value of an evaluation function $J(\rho,\theta,um,ym)$ in a state where a parameter $\theta$ is set to a fixed value $\theta_0$, calculating a value $\theta^*$ that minimizes the evaluation function $J(\rho,\theta,um,ym)$ in a state where a parameter $\rho$ is set to the value $\rho^*$; and calculating a prediction value up of the control input u and a prediction value yp of the control output y corresponding to a desired value r, based on a transfer function $C(\rho^*)$ in which the parameter $\rho$ is set to the value $\rho^*$ and on a target response transfer function $Td(\theta^*)$ in which the parameter $\theta$ is set to the value $\theta^*$.

13 Claims, 12 Drawing Sheets

(51) Int. Cl.
*G06F 17/11* (2006.01)
*G05B 13/04* (2006.01)

(56) References Cited

U.S. PATENT DOCUMENTS

2019/0129385 A1* 5/2019 Takahashi ............ G05B 19/414
2019/0303767 A1* 10/2019 Takahashi ................ G06N 5/02
2020/0004211 A1* 1/2020 Takahashi ............ G05B 13/042
2021/0073437 A1* 3/2021 Takahashi ............... G06F 30/17

FOREIGN PATENT DOCUMENTS

JP 2015-219792 A 12/2015
JP 2017-068658 A 4/2017

* cited by examiner

PREDICTION METHOD, PREDICTION APPARATUS, AND STORAGE MEDIUM STORING COMPUTER PROGRAM

CROSS REFERENCE TO RELATED APPLICATIONS

This application claims priority from Japanese Patent Application No. 2018-065348 filed Mar. 29, 2018. The entire content of the priority application is incorporated herein by reference.

TECHNICAL FIELD

This disclosure relates to a prediction method of predicting a control input and a control output, a prediction apparatus, and a storage medium storing a computer program.

BACKGROUND

A fictitious reference iterative tuning (FRIT) technique is already known as a technique for adjusting a parameter of a controller. In this technique, a parameter of a controller that brings a control output close to a target response is calculated based on an evaluation function. By setting this calculated value in the controller, the controller realizes a control corresponding to the target response.

SUMMARY

The parameter of the controller that is calculated based on the above-described evaluation function brings the control output close to the target response. However, if the calculated value based on the evaluation function is simply set as the parameter of the controller according to the above-described technique, an error still remains between the control output and the target response. More specifically, it is not possible to know the behavior of the controller by only calculating the parameter of the controller according to the conventional technique. In this case, in order to know the behavior of the controller, there is a necessity of actually making and operating a control system in which the controller is incorporated. Thus, the work load of a designer is large.

An example of an object of this disclosure is to provide a technique for easily knowing behavior of a controller.

According to one aspect, this specification discloses a prediction method of predicting a control input u and a control output y in a case where a desired value r is inputted to a controller. The controller is configured to determine the control input u to be inputted to a controlled object based on the desired value r and on the control output y. The prediction method includes: acquiring time-series data of sets of a control input um and a control output ym as a sample of the control input u and the control output y; calculating, based on the time-series data, a value $\rho^*$ of a parameter $\rho$ that minimizes a value of an evaluation function $J(\rho, \theta, um, ym)$ in a state where a parameter $\theta$ is set to a fixed value $\theta 0$, the evaluation function $J(\rho, \theta, um, ym)$ including a transfer function $C(\rho)$ of the controller and a target response transfer function $Td(\theta)$, the transfer function $C(\rho)$ including the parameter $\rho$, the target response transfer function $Td(\theta)$ defining a target response yr corresponding to the desired value r, the target response transfer function $Td(\theta)$ including the parameter $\theta$, the evaluation function $J(\rho, \theta, um, ym)$ being for evaluating an error between the target response yr and the control output ym; calculating a value $\theta^*$ of the parameter $\theta$ that minimizes the value of the evaluation function $J(\rho, \theta, um, ym)$ in a state where the parameter $\rho$ is set to the value $\rho^*$; and calculating a prediction value up of the control input u and a prediction value yp of the control output y corresponding to the desired value r, based on a transfer function $C(\rho^*)$ in which the parameter $\rho$ is set to the value $\rho^*$ and on a target response transfer function $Td(\theta^*)$ in which the parameter $\theta$ is set to the value $\theta^*$.

According to another aspect, this specification also discloses a non-transitory computer-readable storage medium storing a program executable on a computer. The program causes, when executed, the computer to perform operations including: acquiring time-series data of sets of a control input um and a control output ym as a sample of a control input u and a control output y in a case where a desired value r is inputted to a controller, the controller being configured to determine the control input u to be inputted to a controlled object based on the desired value r and the control output y; calculating, based on the time-series data, a value $\rho^*$ of a parameter $\rho$ that minimizes a value of an evaluation function $J(\rho, \theta, um, ym)$ in a state where a parameter $\theta$ is set to a fixed value $\theta 0$, the evaluation function $J(\rho, \theta, um, ym)$ including a transfer function $C(\rho)$ of the controller and a target response transfer function $Td(\theta)$, the transfer function $C(\rho)$ including the parameter $\rho$, the target response transfer function $Td(\theta)$ defining a target response yr corresponding to the desired value r, the target response transfer function $Td(\theta)$ including the parameter $\theta$, the evaluation function $J(\rho, \theta, um, ym)$ being for evaluating an error between the target response yr and the control output ym; calculating a value $\theta^*$ of the parameter $\theta$ that minimizes the value of the evaluation function $J(\rho, \theta, um, ym)$ in a state where the parameter $\rho$ is set to the value $\rho^*$; and calculating a prediction value up of the control input u and a prediction value yp of the control output y corresponding to the desired value r, based on a transfer function $C(\rho^*)$ in which the parameter $\rho$ is set to the value $\rho^*$ and on a target response transfer function $Td(\theta^*)$ in which the parameter $\theta$ is set to the value $\theta^*$.

According to still another aspect, this specification also discloses a prediction apparatus. The prediction apparatus includes a processor and a memory storing instructions. The instructions, when executed by the processor, cause the prediction apparatus to perform: acquiring time-series data of sets of a control input um and a control output ym as a sample of a control input u and a control output y in a case where a desired value r is inputted to a controller, the controller being configured to determine the control input u to be inputted to a controlled object based on the desired value r and the control output y; calculating, based on the time-series data, a value $\rho^*$ of a parameter $\rho$ that minimizes a value of an evaluation function $J(\rho, \theta, um, ym)$ in a state where a parameter $\theta$ is set to a fixed value $\theta 0$, the evaluation function $J(\rho, \theta, um, ym)$ including a transfer function $C(\rho)$ of the controller and a target response transfer function $Td(\theta)$, the transfer function $C(\rho)$ including the parameter $\rho$, the target response transfer function $Td(\theta)$ defining a target response yr corresponding to the desired value r, the target response transfer function $Td(\theta)$ including the parameter $\theta$, the evaluation function $J(\rho, \theta, um, ym)$ being for evaluating an error between the target response yr and the control output ym; calculating a value $\theta^*$ of the parameter $\theta$ that minimizes the value of the evaluation function $J(\rho, \theta, um, ym)$ in a state where the parameter $\rho$ is set to the value $\rho^*$; and calculating a prediction value up of the control input u and a prediction value yp of the control output y corresponding to the desired value r, based on a transfer function $C(\rho^*)$ in which the parameter ρ is set to the value ρ* and on a target response transfer function Td(θ*) in which the parameter θ is set to the value θ*.

BRIEF DESCRIPTION OF THE DRAWINGS

Embodiments in accordance with this disclosure will be described in detail with reference to the following figures wherein.

DETAILED DESCRIPTION

Figure 1:
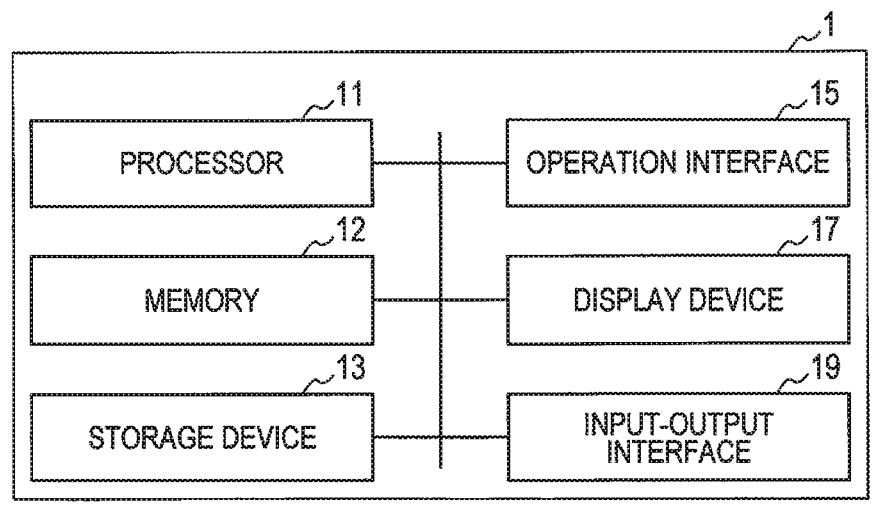
FIG. 1 is a block diagram showing a configuration of a prediction apparatus.

Some aspects of this disclosure will be described while referring to the attached drawings. A prediction apparatus 1 in the embodiment is composed by installing a dedicated computer program in general-purpose information processing apparatus. The prediction apparatus 1 includes a processor 11, a memory 12, a storage device 13, an operation interface 15, a display device 17, and an input-output interface 19. The processor 11 includes a CPU. The memory 12 includes an RAM. The storage device 13 includes at least one of a hard-disk drive and a solid-state drive. The storage device 13 stores a computer program and data.

The processor 11 is configured to execute processing according to the computer program stored in the storage device 13. The memory 12 is used as a work area when executing the processing with the processor 11.

The operation interface 15 is configured to input an operation signal from a user to the processor 11. Examples of the operation interface 15 include a keyboard and a pointing device. The display device 17 is configured to display information for users by being controlled by the processor 11. Examples of the display device 17 include a liquid-crystal display and an organic EL display.

The input-output interface 19 is an interface for inputting data into the prediction apparatus 1, or outputting data to the exterior of the prediction apparatus 1. Examples of the input-output interface 19 include a USB interface.

Figure 2:
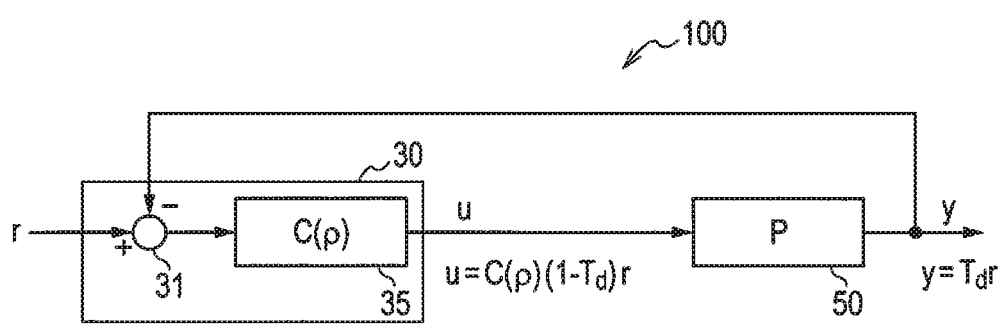
FIG. 2 is a block diagram showing a configuration of a feedback control system.

According to the embodiment, the prediction apparatus 1 is used to predict a control input u and a control output y in a feedback control system 100 shown in FIG. 2. This prediction is performed to allow analysis and understanding of the behavior of a controller 30, by a designer of the controller 30. The feedback control system 100 includes the controller 30 and a plant 50 that is a control target. The controller 30 includes a subtractor 31 and a controller body 35.

The subtractor 31 is configured to input a deviation E=r-y between a desired value (target command) r and the control output y to the controller body 35. The controller body 35 is configured to determine the control input u=C(ρ)E to the plant 50 corresponding to the deviation E, in accordance with a transfer function C(ρ) that has been set. The control output y from the plant 50 is measured by a measurement device (not shown) and is inputted to the subtractor 31.

The designer determines a value of a design variable ρ of the controller 30 such that the control output y matches a target response yr. However, in conventional techniques, even if the value of the design variable ρ is determined, the controller 30 based on that determined value needs to be driven with a real machine in order to correctly know its behavior. The prediction apparatus 1 is configured to predict, with high accuracy, the control input u and the control output y corresponding to the desired value r without driving such a real machine.

The designer utilizes the prediction apparatus 1 to acquire a prediction value up of the control input u and a prediction value yp of the control output y, and analyze and understand the behavior of the controller 30. The designer prepares sample data of the control input u and the control output y in order to utilize the prediction apparatus 1.

Specifically, the designer uses the controller 30 in which the design variable ρ is set to an initial value ρ0, to probatively operate the feedback control system 100 and observe the feedback control system 100, thereby creating time-series data of an observation value um of the control input u and an observation value ym of the control output y with respect to the desired value r, as sample data. The initial value ρ0 is appropriately set by the designer. A control input um described below means the observation value um of the control input u, and a control output ym means the observation value ym of the control output y.

The designer inputs the above-described created time-series data to the prediction apparatus 1 through the input-output interface 19. The prediction apparatus 1 stores this time-series data in the storage device 13. Furthermore, the designer registers (stores) the transfer function C(ρ) of the controller 30 and a target response transfer function Td(θ) in the prediction apparatus 1, through the operation interface 15 or the input-output interface 19.

The target response transfer function $T_d(\theta)$ is a function that defines the target response yr, which is a reference value of the control output y with respect to the desired value r. The target response transfer function $T_d(\theta)$ follows the expression $yr=T_d(\theta)r$. The transfer function $C(\rho)$ and the target response transfer function $T_d(\theta)$ to be registered include a variable parameter $\rho$ and a variable parameter $\theta$, respectively. The variable parameter $\rho$ corresponds to the design variable $\rho$ of the controller 30, and the variable parameter $\theta$ corresponds to the design variable $\theta$ of the target response yr. The designer further registers (stores), in the prediction apparatus 1, an initial value $\theta_0$ of the design variable $\theta$ that defines the desired target response yr.

Then, the designer inputs an execution command of pre-prediction processing to the prediction apparatus 1 through the operation interface 15. When the execution command of the pre-prediction processing is inputted, the processor 11 of the prediction apparatus 1 starts execution of the pre-prediction processing shown in FIG. 3, and reads out the time-series data of the control input um and the control output ym, the transfer function $C(\rho)$, the target response transfer function $T_d(\theta)$, and the initial value $\theta_0$ of the design variable $\theta$ that are registered (stored) in the storage device 13 in advance (S110).

After reading out, the processor 11 fixes the design variable $\theta$ to the initial value $\theta_0$, and calculates a value $\rho^*$ of the design variable $\rho$ that minimizes the value of an evaluation function (S120). The evaluation function used here is the following evaluation function $J(\rho, \theta, um, ym)$ according to the FRIT technique.

$$J(\rho,\theta,u_m,y_m)=\|y_m-T_d(\theta)r(\rho)\|^2 \quad (1)$$

$$r(\rho)=C(\rho)^{-1}u_m+y_m \quad (2)$$

The evaluation function $J(\rho, \theta, um, ym)$ corresponds to a square of a norm (Euclidean norm) of the following function g.

$$g(\rho,\theta,u_m,y_m)=y_m-T_d(\theta)r(\rho) \quad (3)$$

As can be understood from the above expression, the evaluation function $J(\rho, \theta, um, ym)$ is for evaluating an error between the control output y and the target response yr. Specifically, the larger the error, the larger a value indicated by the evaluation function $J(\rho, \theta, um, ym)$.

Once the processor 11 finishes the calculation of the value $\rho^*$ that minimizes the value of the evaluation function $J(\rho, \theta=\theta_0, um, ym)$, the processor 11 then fixes the design variable $\rho$ to the calculated value $\rho^*$, and calculates the value $\theta^*$ of the design variable $\theta$ that minimizes the value of the evaluation function $J(\rho=\rho^*, \theta, um, ym)$ (S130).

Then, the processor 11 registers (stores) the calculated value $\rho^*$ in S120 and the calculated value $\theta^*$ in S130 in the storage device 13 as definition values of prediction expressions (S140), and completes the pre-prediction processing.

Figure 4:
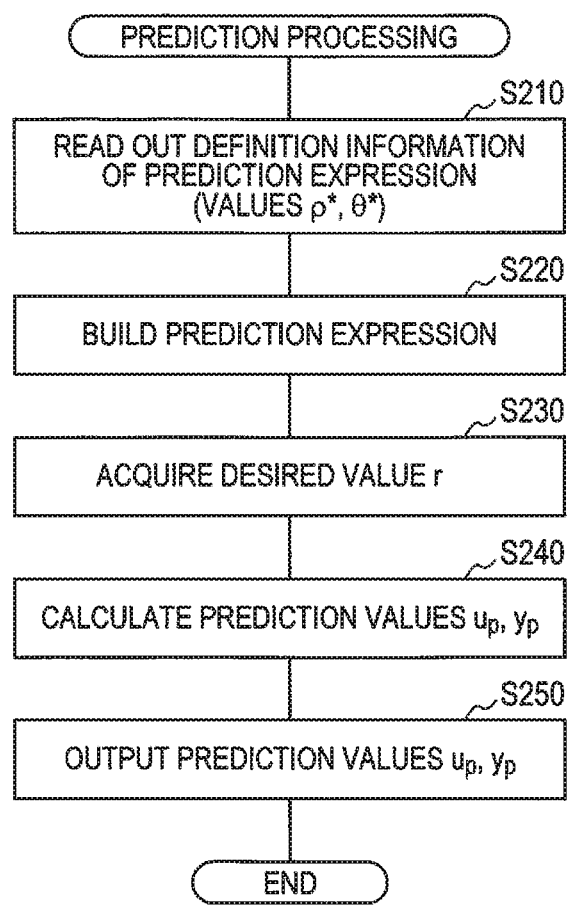
FIG. 4 is a flowchart showing prediction processing to be executed by a processor.

After the completion of the pre-prediction processing, the designer of the controller 30 inputs an execution command of prediction processing shown in FIG. 4 to the prediction apparatus 1 through the operation interface 15. As shown in FIG. 4, once the execution command of the prediction processing is inputted, the processor 11 of the prediction apparatus 1 reads out definition information of the prediction expressions (S210). Specifically, the definition values $\rho^*$ and $\theta^*$ of the prediction expressions registered in S140 are read out. Furthermore, the transfer function $C(\rho)$ and the target response transfer function $T_d(\theta)$ defining the prediction expressions are read out.

Then, the processor 11 establishes (builds) the prediction expression of the control input u and the prediction expression of the control output y based on the read-out definition information (S220). The established prediction expression of the control input u and the prediction expression of the control output y (that is, the calculation expression of the prediction value up of the control input u and the calculation expression of the prediction value yp of the control output y) are as follows. And, the established prediction expressions include the value $\rho^*$ and the value $\theta^*$ registered in S140.

$$u_p=C(\rho^*)(r-y_p)=C(\rho^*)(1-T_d(\theta^*))r \quad (4)$$

$$t_p=T_d(\theta^*)r \quad (5)$$

The processor 11 further acquires the desired value r to be used for prediction (S230). The processor 11 may acquire the desired value r from an operator through the operation interface 15, or by reading out from the storage device 13.

Then, the processor 11 assigns the acquired desired value r to the prediction expressions established in S220, and calculates the prediction value up of the control input u and the prediction value yp of the control output y (S240). In this manner, in S240, the time-series data of the prediction value up and the prediction value yp corresponding to the desired value r is generated. More specifically, $\rho^*$ and $\theta^*$ are fixed in expressions (4) and (5). Hence, when a certain value is assigned to the desired value r, the expressions (4) and (5) have only Laplace operator "s" as a variable. By performing inverse Laplace transformation on the expressions (4) and (5), expressions having time t as a variable are obtained. By assign a plurality of time points to time tin the obtained expressions, time-series data of prediction value up and prediction value yp are generated.

The processor 11 further outputs information on the prediction value up and the prediction value yp (S250). Specifically, the processor 11 stores, in the storage device 13, the time-series data of the prediction value up and the prediction value yp generated in S240. The processor 11 may control the display device 17 to display graphs of the prediction value up and the prediction value yp on the display device 17. Then, the processor 11 completes the prediction processing.

In this manner, the designer of the controller 30 analyzes and understands the behavior of the controller 30 based on the time-series data of the prediction value up and the prediction value yp provided from the prediction apparatus 1 and on the graphs displayed on the display device 17. By analyzing and understanding behavior of the controller 30, for example, the designer of the controller 30 may modify design of the controller 30 based on the analysis. The designer of the controller 30 may also check whether the behavior of the controller 30 (the prediction values up and yp) does not cause a failure or damage to the real machine.

Figure 5A:
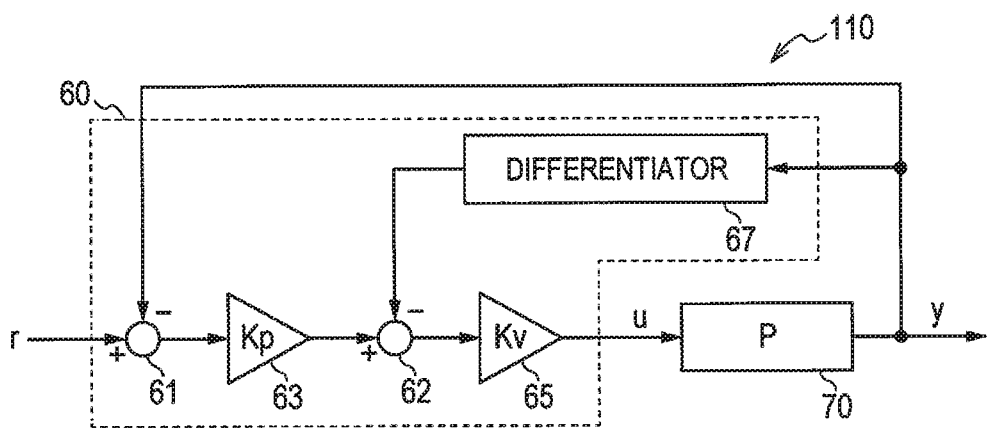
FIG. 5A is a block diagram showing a specific example of a control system.
Figure 5B:
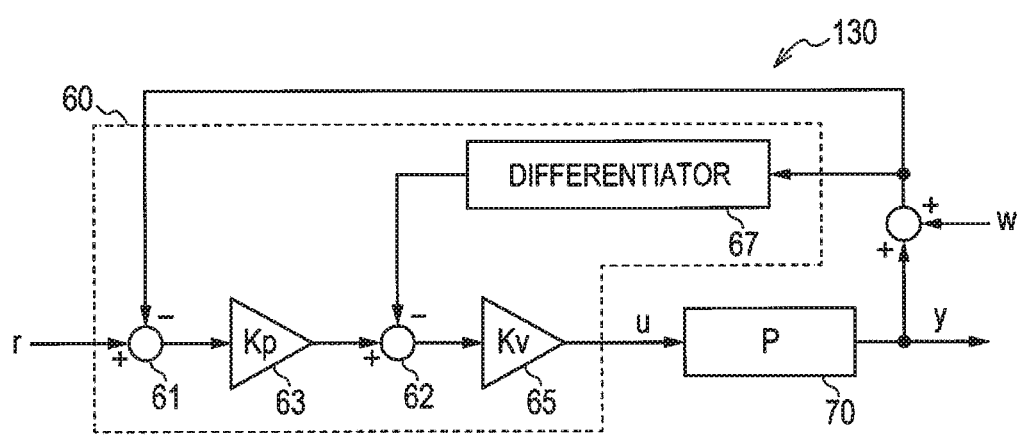
FIG. 5B is a block diagram showing a specific example of a control system including a disturbance input.

Here, FIGS. 6A to 6B and FIGS. 7A to 7C show experimental results on prediction accuracy of the control input u and the control output y based on a specific feedback control system 110 shown in FIG. 5A. The feedback control system 110 includes a controller 60 and a plant 70. The controller 60 includes subtractors 61, 62, an amplifier 63 having a gain Kp, an amplifier 65 having a gain Kv, and a differentiator 67. The experiment was conducted by setting the target response transfer function $T_d(\theta)$ according to the following expression, in the feedback control system 110.

$$T_d(\theta) = \frac{\omega_1^2}{s^2 + 2\zeta_1\omega_1 s + \omega_1^2} \frac{\omega_2^2}{s^2 + 2\zeta_2\omega_2 s + \omega_2^2} \quad (6)$$

$$\theta = [\zeta_1 \ \omega_1 \ \zeta_2 \ \omega_2] \quad (7)$$

The evaluation function J(ρ, θ, um, ym) for the feedback control system 110 is defined by setting the following r(ρ) for the above-described expression (1). Here, F represents a differential operator.

$$r(\rho) = \rho_1 u_m + \rho_2 F y_m + y_m \quad (8)$$

$$\rho = [\rho_1 \rho_2] \quad (9)$$

$$\rho_1 = \frac{1}{K_p K_v} \quad (10)$$

$$\rho_2 = \frac{1}{K_p} \quad (11)$$

FIGS. 6A to 6B and FIGS. 7A to 7C further show experimental results when defining the initial value ρ0 of the design variable ρ with Kp=10 and Kv=0.1, and defining the initial value θ0 of the design variable θ with, $\zeta_1=\zeta_2=1$ and $\omega_1=\omega_2=20$.

Figure 3:
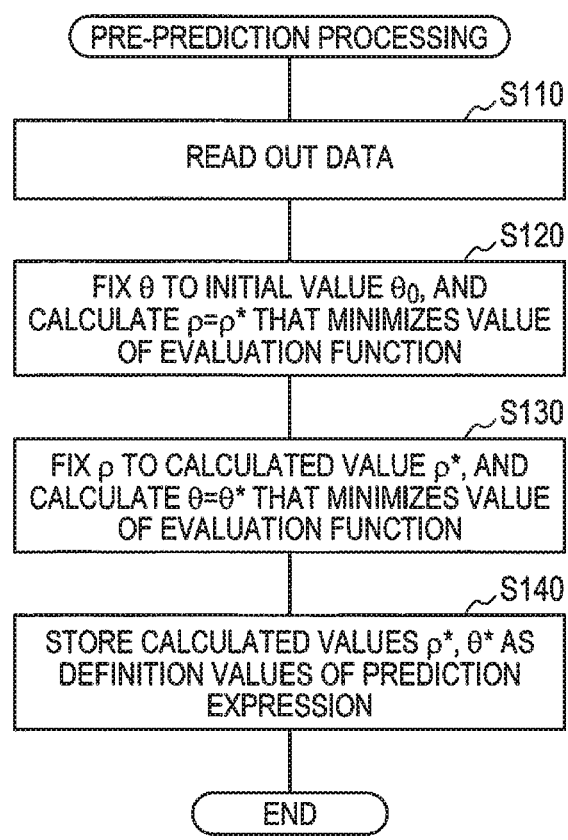
FIG. 3 is a flowchart showing pre-prediction processing to be executed by a processor.

The experiment was conducted by obtaining the time-series data of the control input um and the control output ym in the feedback control system 110 by using the controller 60 having the initial value ρ0, and causing the prediction apparatus 1 to execute the processing shown in FIG. 3 and FIG. 4 by using these time-series data and initial value θ0, thereby obtaining the time-series data of the prediction value up and the prediction value yp.

In this experiment, Kp=16.2 and Kv=4.39 were obtained as values of Kp and Kv corresponding to ρ*, and $\zeta_1=2.47 \times 10^5$, $\zeta_2=8.02\times10^{-1}$, $\omega_1=5.94\times10^7$, and $\omega_2=8.72$ were obtained as values of $\zeta_1$, $\zeta_2$, $\omega_1$, and $\omega_2$ corresponding to θ*.

Figure 6A:
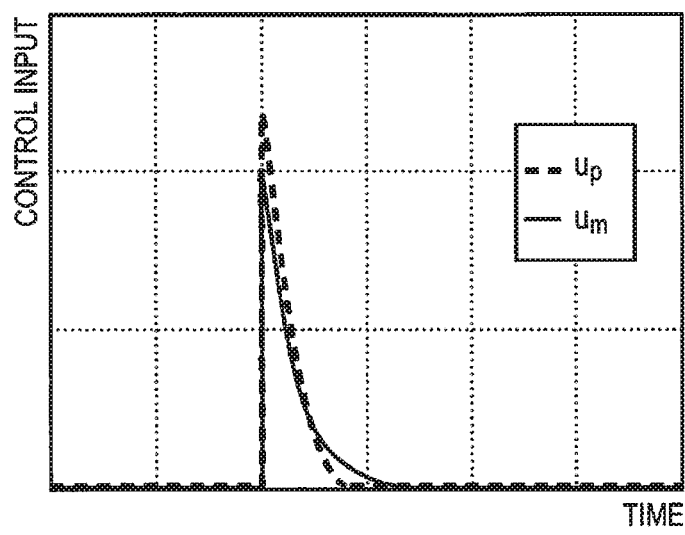
FIGS. 6A and 6B are graphs showing prediction values of a control input.
Figure 6B:
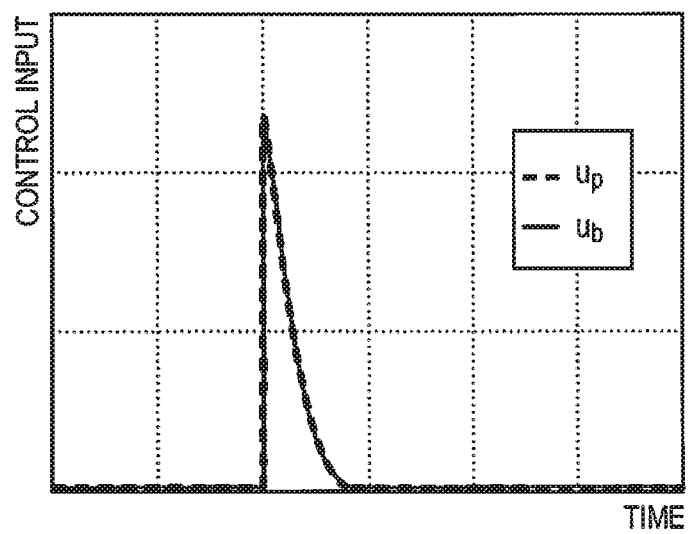

FIG. 6A is a graph showing the prediction value up of the control input u calculated by using these values ρ* and θ* with a broken line, and showing the observation value um before prediction with a solid line, wherein the horizontal axis represents time and the vertical axis represents control inputs. FIG. 6B is a graph showing an observation value ub of the control input u that was obtained in another experiment (a real machine was used) by using the values ρ* and θ*, with a solid line. This graph shows the prediction value up same as FIG. 6A.

Figure 7A:
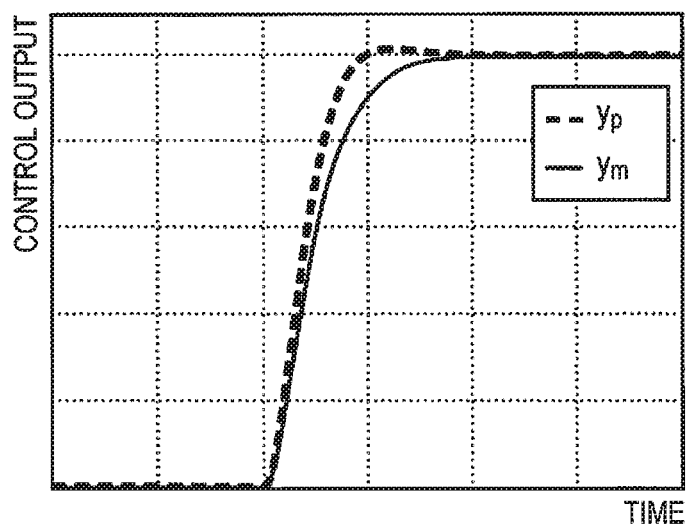
FIGS. 7A to 7C are graphs showing prediction values of a control output.
Figure 7B:
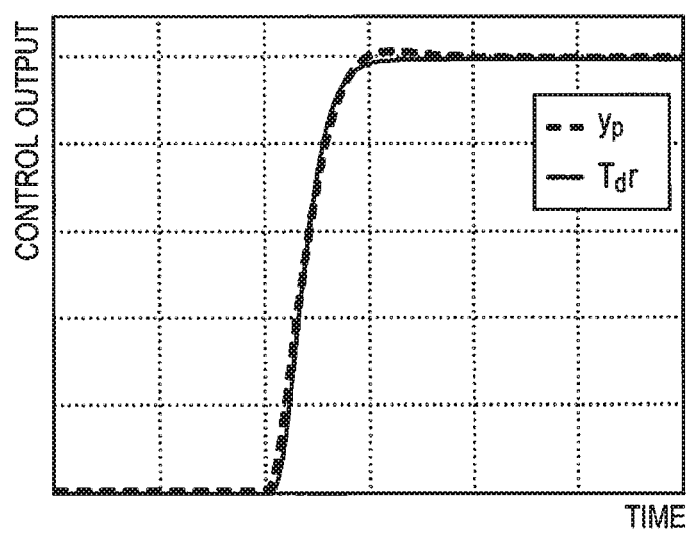
Figure 7C:
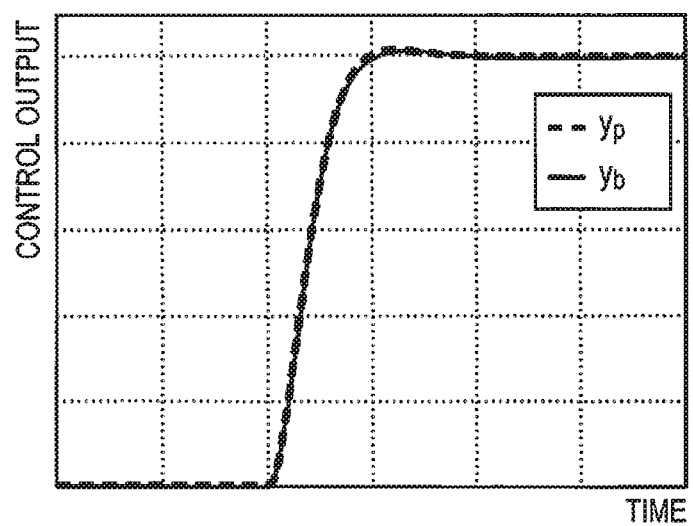

FIGS. 7A to 7C are graphs showing the prediction value yp of the control output y that was calculated by using the values ρ* and θ* same as FIGS. 6A and 6B, with a broken line, wherein the horizontal axis represents time and the vertical axis represents control outputs. The graph in FIG. 7A further shows the observation value ym before prediction with a solid line; the graph in FIG. 7B further shows the target response yr=Td(θ0)r according to the initial value θ0 with a solid line; and the graph in FIG. 7C further shows an observation value yb of the control output y that was obtained in another experiment (a real machine was used) by using the values ρ* and θ*, with a solid line.

It can be well-understood from the graphs in FIG. 6B and FIG. 7C that the prediction value up and the prediction value yp obtained from the prediction apparatus 1 are highly accurate. When ρ and θ are the adjusted values ρ* and θ*, an error between the control output y and the target response yr has decreased to one-twentieth as compared to when ρ and θ are the initial values ρ0 and θ0.

An example in which the control input u and the control output y are predicted without considering a disturbance or a change in a plant has been described above. However, the prediction value up and the prediction value yp may be calculated by considering such disturbance or change in a plant.

According to this prediction method, appropriate values ρ* and θ* of the parameter ρ and the parameter θ are obtained in accordance with the evaluation function J(ρ, θ, um, ym). Thus, based on the transfer function C(ρ*) and the target response transfer function Td(θ*), accurate prediction value up and prediction value yp of the control input u and the control output y corresponding to the desired value r is calculated. Thus, behavior of the controller corresponding to the desired value r can be readily known without repetitious experiments using a real machine.

Modifications described below are examples in which the prediction expressions are different from those in the above-described embodiment. On the other hand, regarding other configurations, these modifications have the same configurations as the above-described embodiment. Accordingly, in the descriptions of the modifications below, descriptions regarding the same configurations as the above-described embodiment are appropriately omitted.

[First Modification]

Figure 8A:
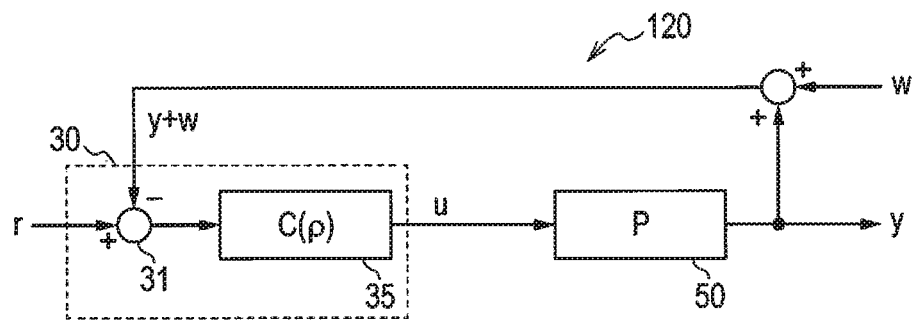
FIG. 8A is a block diagram showing a control system including a disturbance to be added to a control output.
Figure 8B:
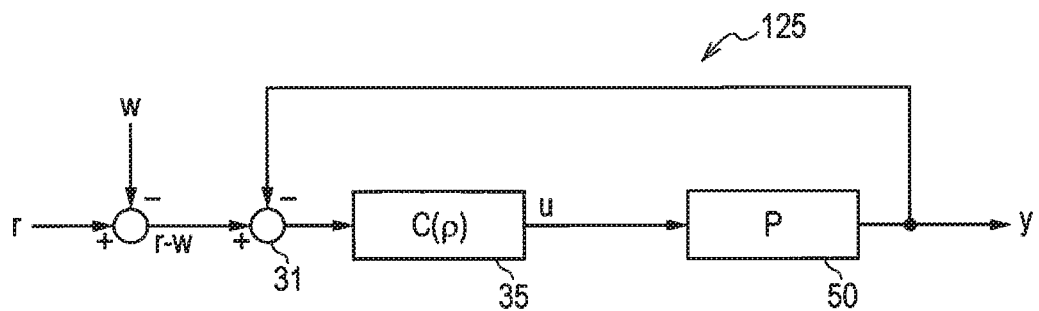
FIG. 8B is a block diagram showing a control system that is equivalent to the control system shown in FIG. 8A.

The prediction apparatus 1 of a first modification is configured to calculate the prediction value up of the control input u and the prediction value yp of the control output y, by considering a disturbance w to be added to the control output y. A corresponding feedback control system 120 is shown in FIG. 8A, and a control system 125 that is equivalent to the feedback control system 120 is shown in FIG. 8B.

The prediction that considers the disturbance w is realized by establishing prediction expressions according to the following expression in S220. The processor 11 acquires information on the disturbance w as a part of definition information on the prediction expressions in S210, or acquires this information together with the desired value r in S230.

$$u_p = C(\rho^*)\{r - (y_p + w)\} \quad (12)$$

$$y_p = T_d(\theta^*)(r - w) \quad (13)$$

According to these prediction expressions, the prediction of the control input u and the control output y can be performed by considering the disturbance w to be added to the control output y. Examples of the disturbance w include noise to be added to the control output y in a measurement device that measures the control output y. The designer analyzes and understands the behavior of the controller 30 being affected by the disturbance w in detail, by changing the disturbance w to be given to the prediction expressions, and obtaining various prediction values up and prediction values yp.

Figure 9A:
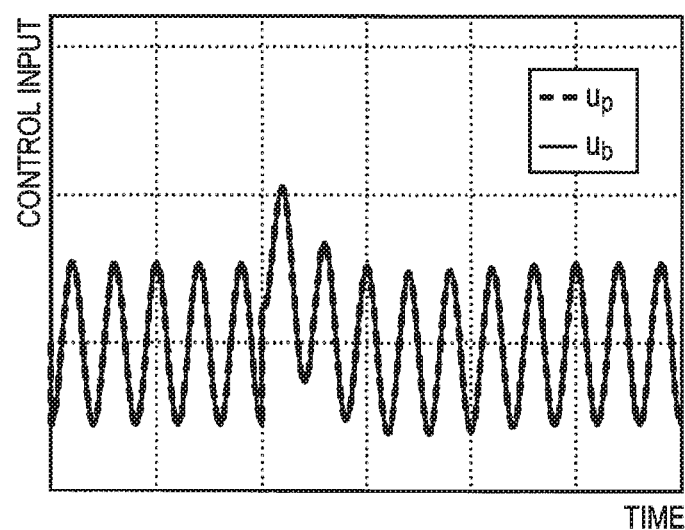
FIG. 9A is a graph showing a prediction value of a control input in a control system including a sine wave disturbance.
Figure 9B:
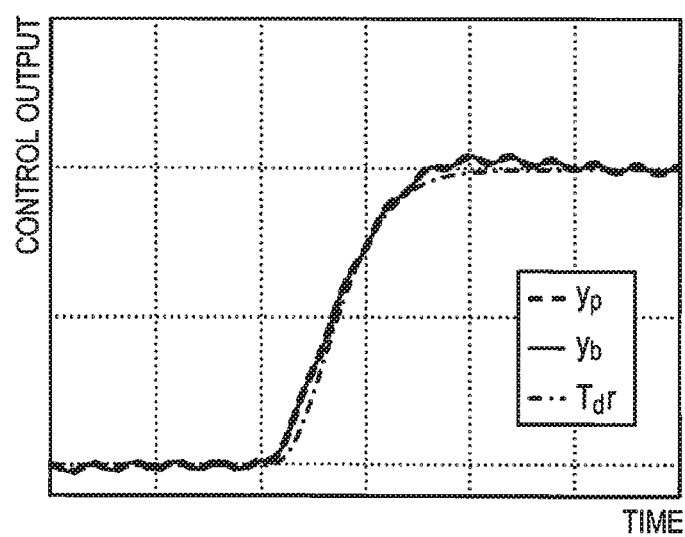
FIG. 9B is a graph showing a prediction value of a control output corresponding to FIG. 9A.

Here, FIG. 9A and FIG. 9B show experimental results on prediction accuracy of the control input u and the control output y based on a specific feedback control system 130. The feedback control system 130 corresponds to an example in which the disturbance w is added to the control output y in the feedback control system 110 shown in FIG. 5A. The experiment corresponds to an experimental result when a sine wave disturbance is inputted to the feedback control system 130 as the disturbance w.

FIG. 9A is a graph showing the prediction value up of the control input u with a broken line, and showing the observation value ub of the control input u that was obtained in another experiment with a solid line, wherein the horizontal axis represents time and the vertical axis represents control inputs. FIG. 9B is a graph showing the prediction value yp of the control output y with a broken line, and showing the observation value yb of the control output y that was obtained in another experiment with a solid line, wherein the horizontal axis represents time and the vertical axis represents control outputs. FIG. 9B further shows the target response yr=Td(θ0)r of the initial value θ0 with a single-dot chain line. It can be well-understood from FIG. 9A and FIG. 9B that, according to the present modification, the prediction value up of the control input u and the prediction value yp of the control output y in the feedback control system 130 including the disturbance w can be obtained with high accuracy.

The function of predicting the control input u and the control output y that considers the disturbance w may be incorporated in the prediction apparatus 1 of the above-described embodiment as one of operation modes. More specifically, the prediction apparatus 1 may be configured to receive the execution command of prediction processing together with specification of the operation mode. The processor 11 may be configured to execute processing corresponding to the specified operation mode, as the prediction processing shown in FIG. 4.

The processor 11 may operate so as to calculate the prediction value up and the prediction value yp based on the prediction expressions according to the embodiment that was explained at the beginning, that is, the prediction expressions according to the above-described expressions (4) and (5), in the operation mode not considering a disturbance, and calculate the prediction value up and the prediction value yp based on the prediction expressions according to the present modification, that is, the prediction expressions according to the above-described expressions (12) and (13), in the operation mode considering the disturbance w. By using the prediction apparatus 1 that switches the prediction expressions according to the specified operation mode, the designer can analyze and understand the behavior of the controller 30 in more detail.

[Second Modification]

Figure 10A:
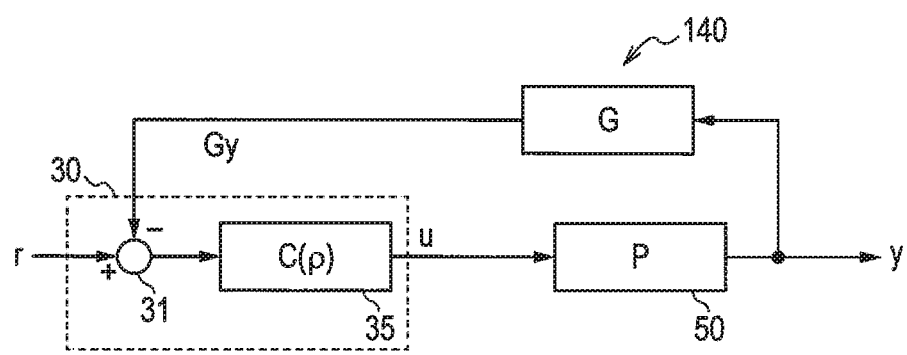
FIG. 10A is a block diagram showing a control system including a disturbance to be multiplied by a control output.
Figure 10B:
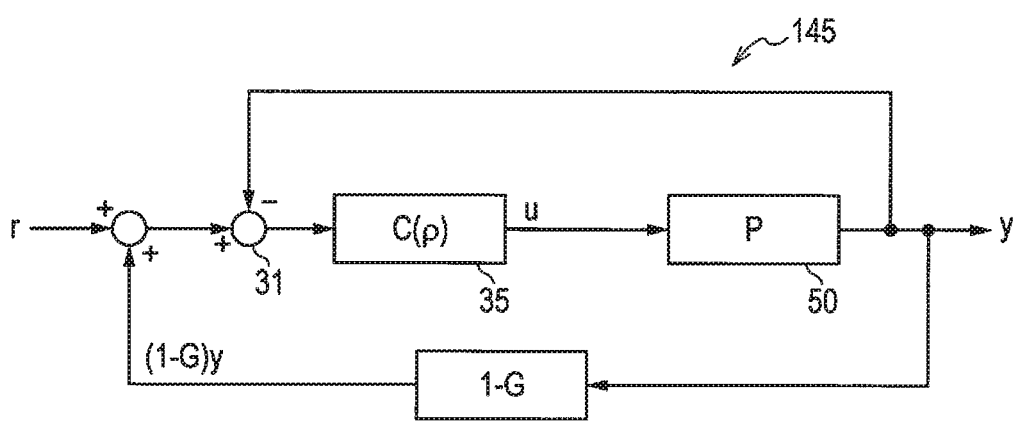
FIG. 10B is a block diagram showing a control system that is equivalent to the control system shown in FIG. 10A.

The prediction apparatus 1 of a second modification is configured to calculate the prediction value up of the control input u and the prediction value yp of the control output y by considering a disturbance G to be multiplied by the control output y. A corresponding feedback control system 140 is shown in FIG. 10A, and a control system 145 that is equivalent to the feedback control system 140 is shown in FIG. 10B.

The prediction that considers the disturbance G is realized by establishing prediction expressions according to the following expression in S220. The processor 11 acquires information on the disturbance G as a part of definition information on the prediction expressions in S210, or acquires this information together with the desired value r in S230.

$$u_p = C(\rho^*)(r - Gy_p) \tag{14}$$

$$y_p = \frac{T_d(\theta^*)}{1 - T_d(\theta^*) + T_d(\theta^*)G} r \tag{15}$$

According to these prediction expressions, the prediction of the control input u and the control output y can be performed by considering the disturbance G to be multiplied by the control output y. Examples of the disturbance G include a disturbance to be multiplied by the control output y due to the characteristic of a measurement device that measures the control output y. The function of predicting the control input u and the control output y that considers the disturbance G of the present modification may be incorporated in the prediction apparatus 1 of the above-described embodiment, as one of operation modes as in the case of the first modification.

[Third Modification]

Figure 11A:
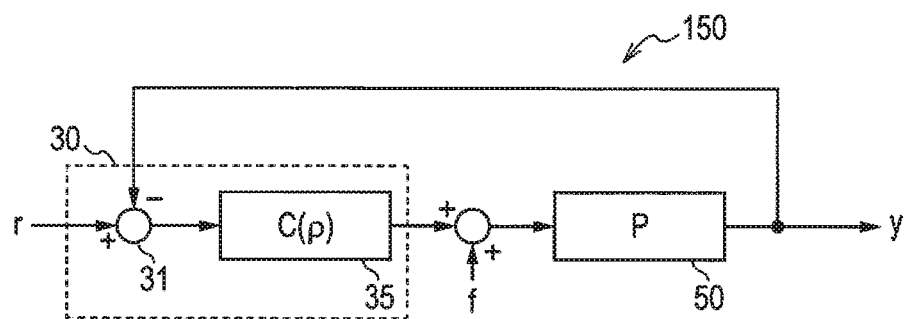
FIG. 11A is a block diagram showing a control system including a disturbance to be added to a control input.
Figure 11B:
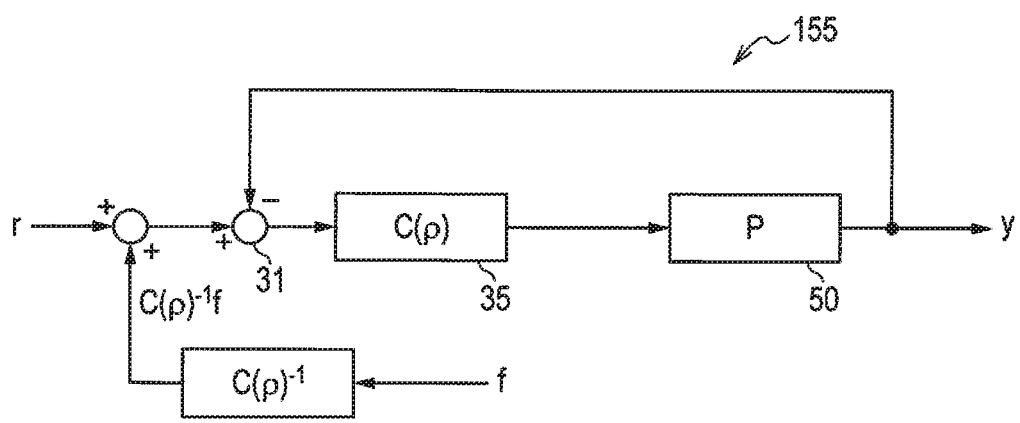
FIG. 11B is a block diagram showing a control system that is equivalent to the control system shown in FIG. 11A.

The prediction apparatus 1 of a third modification is configured to calculate the prediction value up of the control input u and the prediction value yp of the control output y by considering a disturbance f to be added to the control input u. A corresponding feedback control system 150 is shown in FIG. 11A, and a control system 155 that is equivalent to the feedback control system 150 is shown in FIG. 11B.

The prediction that considers the disturbance f is realized by establishing prediction expressions according to the following expression in S220. The processor 11 acquires information on the disturbance f as a part of definition information on the prediction expressions in S210, or acquires this information together with the desired value r in S230.

$$u_p = C(\rho^*)(r - y_p) \tag{16}$$

$$y_p = T_d(\theta^*)(r + C(\rho^*)^{-1}f) \tag{17}$$

According to these prediction expressions, the prediction of the control input u and the control output y can be performed by considering the disturbance f to be added to the control input u. Examples of the disturbance f include the friction, load, and external force generated in a mechanism included in the plant 50. The function of predicting the control input u and the control output y that considers the disturbance f of the present modification may be incorporated in the prediction apparatus 1 of the above-described embodiment as one of operation modes, as in the cases of the previously described modifications.

[Fourth Modification]

Figure 12A:
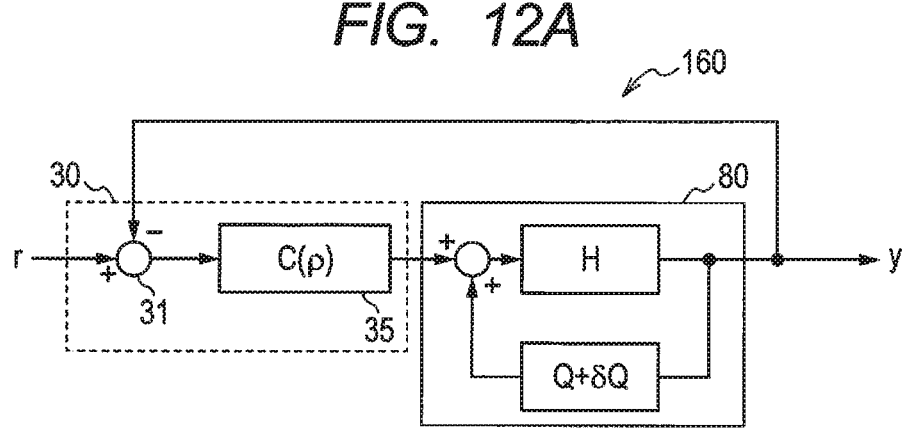
FIG. 12A is a block diagram showing a first example of a control system in which a transfer characteristic of a plant changes.
Figure 12B:
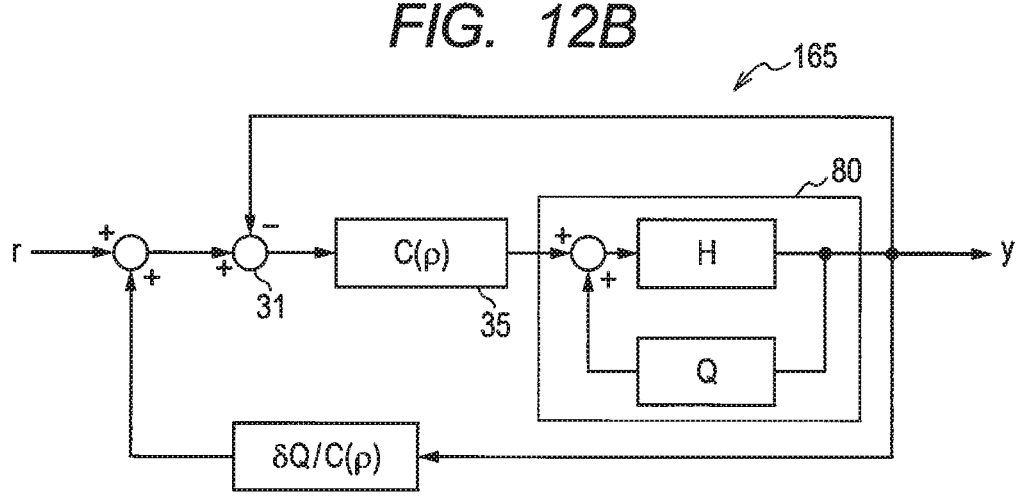
FIG. 12B is a block diagram showing a control system that is equivalent to the control system shown in FIG. 12A.

The prediction apparatus 1 of a fourth modification is configured to calculate the prediction value up of the control input u and the prediction value yp of the control output y while considering a change 6Q in a transfer characteristic of a plant. A corresponding feedback control system 160 is shown in FIG. 12A, and a control system 165 that is equivalent to the feedback control system 160 is shown in FIG. 12B. A transfer function P of a plant 80 indicating a relationship between the control input u and the control output y that is provided in the feedback control system 160 is represented by the following expression.

$$P = \frac{H}{1 - H(Q + \delta Q)} \tag{18}$$

The prediction that considers the change δQ in the transfer characteristic of the plant 80 is realized by establishing prediction expressions according to the following expressions in S220. The processor 11 acquires information on the change δQ as a part of definition information on the prediction expressions in S210, or acquires this information together with the desired value r in S230.

$$u_p = C(p^*)(r - y_p) \quad (19)$$

$$y_p = \frac{C(\rho^*)T_d(\theta^*)}{C(\rho^*) - T_d(\theta^*)\delta Q} r \quad (20)$$

Figure 12C:
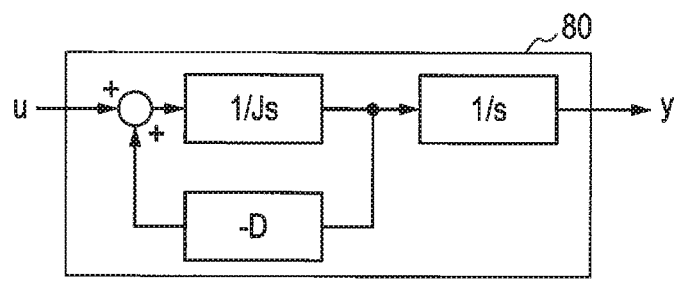
FIG. 12C is a block diagram showing a specific example of a transfer characteristic of a plant.

According to these prediction expressions, the prediction of the control input u and the control output y can be performed by considering the change δQ in the transfer characteristic of the plant 80. Examples of the change δQ in the transfer characteristic of the plant 80 include a change in a viscous friction D within the plant 80. FIG. 12C shows the transfer characteristic of the plant 80 where a viscous friction of a motor changes. According to this example, the transfer function P of the plant 80 is represented by the following expression.

$$P = \frac{1}{s}\left(\frac{1}{Js + D}\right) \quad (21)$$

Here, D corresponds to a coefficient of viscous friction, J corresponds to an inertia moment, and s corresponds to a Laplace operator. According to this example, the designer is able to analyze and understand the behavior of the controller 30 that considers the change in the viscous friction, in detail. The function of predicting the control input u and the control output y that considers the change δQ in the transfer characteristic of the plant of the present modification may be incorporated in the prediction apparatus 1 of the above-described embodiment as one of operation modes, as in the cases of the previously described modifications.

[Fifth Modification]

Figure 13A:
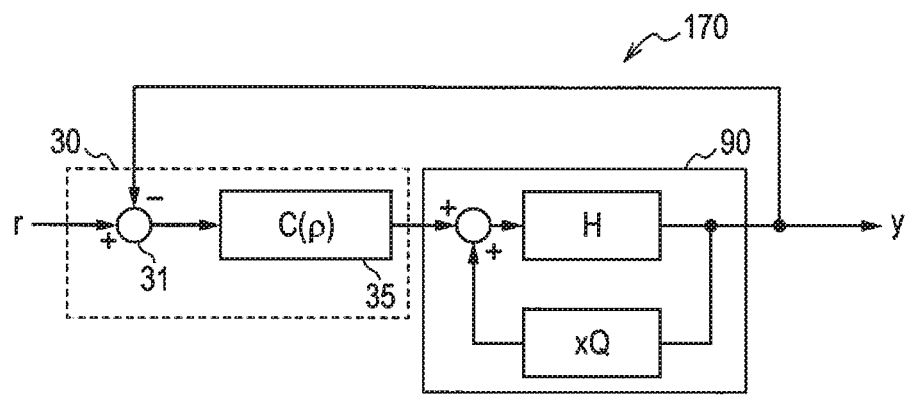
FIG. 13A is a block diagram showing a second example of a control system in which a transfer characteristic of a plant changes.
Figure 13B:
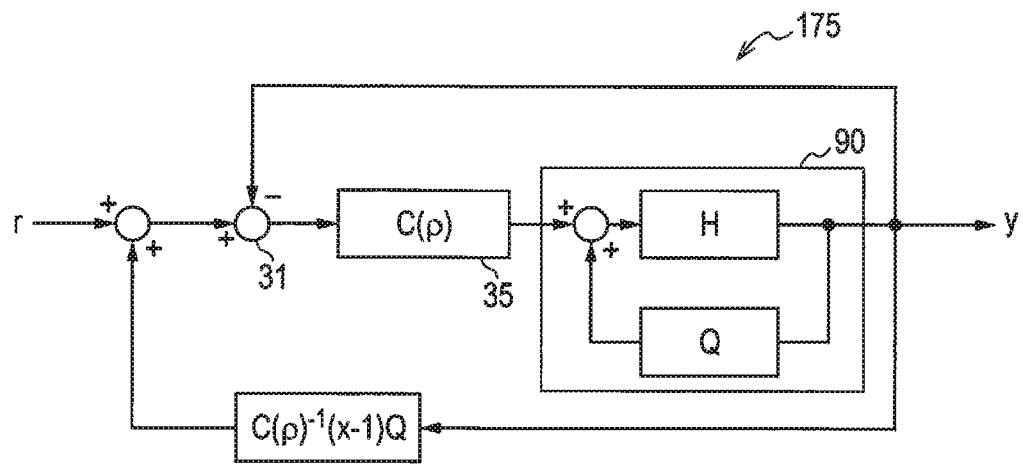
FIG. 13B is a block diagram showing a control system that is equivalent to the control system shown in FIG. 13A.

The prediction apparatus 1 of a fifth modification is configured to calculate the prediction value up of the control input u and the prediction value yp of the control output y while considering a change (x−1)Q in a transfer characteristic of a plant. A variable x corresponds to a fluctuation component. A corresponding feedback control system 170 is shown in FIG. 13A, and a control system 175 that is equivalent to the feedback control system 170 is shown in FIG. 13B.

The prediction that considers the change (x−1)Q in the transfer characteristic of a plant 90 in the feedback control system 170 is realized by establishing prediction expressions according to the following expressions in S220. The processor 11 acquires information on the change (x−1)Q as a part of definition information on the prediction expressions in S210, or acquires this information together with the desired value r in S230.

$$u_p = C(\rho^*)(r - y_p) \quad (22)$$

$$y_p = \frac{C(\rho^*)T_d(\theta^*)}{C(\rho^*) - (x-1)T_d(\theta^*)Q} r \quad (23)$$

According to these prediction expressions, the prediction of the control input u and the control output y can be performed by considering the change (x−1)Q in the transfer characteristic of the plant 90. The above-described change (x−1)Q in the present modification corresponds to the change δQ of the fourth modification. The function of predicting the control input u and the control output y that considers the change (x−1)Q in the transfer characteristic of the plant 90 of the present modification may be incorporated in the prediction apparatus 1 of the above-described embodiment as one of operation modes, as in the cases of the previously described modifications.

While the disclosure has been described in detail with reference to the above aspects thereof, it would be apparent to those skilled in the art that various changes and modifications may be made therein without departing from the scope of the claims.

For example, the prediction apparatus does not have to be realized by causing a general-purpose computer to execute processing based on a computer program. More specifically, the prediction apparatus may be configured to execute corresponding processing with a dedicated hardware circuit.

The processing of S110 executed by the processor 11 is a non-limiting example of processing realized by an acquiring unit. The processing of S120 executed by the processor 11 is a non-limiting example of processing realized by a first calculating unit. The processing of S130 executed by the processor 11 is a non-limiting example of processing realized by a second calculating unit. The prediction processing executed by the processor 11 is a non-limiting example of processing realized by a prediction unit.

The above-described control system can be applied to any feedback control system such as a control system of rotational positions of a sheet conveyance roller in a printer, a machine tool, a robot, a temperature control, and so on. U.S. patent application Ser. No. 16/168,183 filed Oct. 23, 2018 discloses an outline of the control system of the rotational position of a sheet conveyance roller in a printer. In this example, the sheet conveyance roller is configured to be driven by a motor and to convey a sheet in the printer. The control input u is a drive current or a drive voltage which is applied to the motor. The control output y is the rotational position of the conveyance roller. The control output y may be the rotational speed of the conveyance roller. The entire content of U.S. patent application Ser. No. 16/168,183 is incorporated herein by reference.

What is claimed is:

1. A prediction method of predicting a control input u and a control output y in a case where a desired value r is inputted to a controller, the controller being configured to determine the control input u to be inputted to a controlled object based on the desired value r and on the control output y, the prediction method comprising:

acquiring time-series data of sets of a control input um and a control output ym as a sample of the control input u and the control output y;

calculating, based on the time-series data, a value ρ* of a parameter ρ that minimizes a value of an evaluation function J(ρ, θ, um, ym) in a state where a parameter θ is set to a fixed value θ0, the evaluation function J(ρ, θ, um, ym) including a transfer function C(ρ) of the controller and a target response transfer function Td(θ), the transfer function C(ρ) including the parameter ρ, the target response transfer function Td(θ) defining a target response yr corresponding to the desired value r, the target response transfer function Td(θ) including the parameter θ, the evaluation function J(ρ, θ, um, ym) being for evaluating an error between the target response yr and the control output ym;

calculating a value θ* of the parameter θ that minimizes the value of the evaluation function J(ρ, θ, um, ym) in a state where the parameter ρ is set to the value ρ*; and calculating a prediction value up of the control input u and a prediction value yp of the control output y corresponding to the desired value r, based on a transfer function C(ρ*) in which the parameter ρ is set to the value ρ* and on a target response transfer function Td(θ*) in which the parameter θ is set to the value θ*.

2. The prediction method according to claim 1, wherein the evaluation function J(ρ, θ, um, ym) is a function based on FRIT (Fictitious Reference Iterative Tuning) technique.

3. The prediction method according to claim 1, wherein the controller is configured to determine the control input u=C(ρ)(r−y) based on a deviation (r−y) between the desired value r and the control output y; and
wherein the evaluation function J(ρ, θ, um, ym) corresponds to a norm of a function g(ρ, θ, um, ym) expressed by first expressions;

$$g(\rho,\theta,u_m,y_m)=y_m-T_d(\theta)r(\rho)$$

$$r(\rho)=C(\rho)^{-1}u_m+y_m \quad \text{[First Expressions]}$$

4. The prediction method according to claim 3, wherein the prediction value up and the prediction value yp are calculated in accordance with second expressions;

$$u_p=C(\rho^*)(r-y_p)=C(\rho^*)(1-T_d(\theta^*))r$$

$$y_p=T_d(\theta^*)r \quad \text{[Second Expressions]}$$

5. The prediction method according to claim 1, wherein the prediction value up and the prediction value yp are calculated by considering a disturbance.

6. The prediction method according to claim 3, wherein the prediction value up and the prediction value yp are calculated in accordance with third expressions considering a disturbance w to be added to the control output y;

$$u_p=C(\rho^*)\{r-(y_p+w)\}$$

$$y_p=T_d(\theta^*)(r-w) \quad \text{[Third Expressions]}$$

7. The prediction method according to claim 3, wherein the prediction value up and the prediction value yp are calculated in accordance with fourth expressions considering a disturbance f to be added to the control input u;

$$u_p=C(\rho^*)(r-y_p)$$

$$y_p=T_d(\theta^*)(r+C(\rho^*)^{-1}f) \quad \text{[Fourth Expressions]}$$

8. The prediction method according to claim 3, wherein the prediction value up and the prediction value yp are calculated in accordance with fifth expressions considering a disturbance G to be multiplied by the control output y;

$$u_p = C(\rho^*)(r - Gy_p) \quad \text{[Fifth Expressions]}$$

$$y_p = \frac{T_d(\theta^*)}{1 - T_d(\theta^*) + T_d(\theta^*)G}r$$

9. The prediction method according to claim 1, wherein the prediction value up and the prediction value yp are calculated by considering a change in the controlled object.

10. The prediction method according to claim 3, wherein the prediction value up and the prediction value yp are calculated in accordance with sixth expressions considering a change δQ in the controlled object.

$$u_p = C(\rho^*)(r - y_p) \quad \text{[Sixth Expressions]}$$

$$y_p = \frac{C(\rho^*)T_d(\theta^*)}{C(\rho^*) - T_d(\theta^*)\delta Q}r$$

11. The prediction method according to claim 1, wherein the controlled object is a sheet conveyance roller in a printer, the sheet conveyance roller being configured to be driven by a motor and to convey a sheet in the printer, the control input u is one of a drive current and a drive voltage which is applied to the motor, and the control output y is one of a rotational position of the sheet conveyance roller and a rotational speed of the sheet conveyance roller.

12. A non-transitory computer-readable storage medium storing a program executable on a computer, the program causing, when executed, the computer to perform operations comprising:
acquiring time-series data of sets of a control input um and a control output ym as a sample of a control input u and a control output y in a case where a desired value r is inputted to a controller, the controller being configured to determine the control input u to be inputted to a controlled object based on the desired value r and the control output y;
calculating, based on the time-series data, a value ρ* of a parameter ρ that minimizes a value of an evaluation function J(ρ, θ, um, ym) in a state where a parameter θ is set to a fixed value θ0, the evaluation function J(ρ, θ, um, ym) including a transfer function C(ρ) of the controller and a target response transfer function Td(θ), the transfer function C(ρ) including the parameter ρ, the target response transfer function Td(θ) defining a target response yr corresponding to the desired value r, the target response transfer function Td(θ) including the parameter θ, the evaluation function J(ρ, θ, um, ym) being for evaluating an error between the target response yr and the control output ym;
calculating a value θ* of the parameter θ that minimizes the value of the evaluation function J(ρ, θ, um, ym) in a state where the parameter ρ is set to the value ρ*; and
calculating a prediction value up of the control input u and a prediction value yp of the control output y corresponding to the desired value r, based on a transfer function C(ρ*) in which the parameter ρ is set to the value ρ* and on a target response transfer function Td(θ*) in which the parameter θ is set to the value θ*.

13. A prediction apparatus comprising:
a processor; and
a memory storing instructions, the instructions, when executed by the processor, causing the prediction apparatus to perform:
acquiring time-series data of sets of a control input um and a control output ym as a sample of a control input u and a control output y in a case where a desired value r is inputted to a controller, the controller being configured to determine the control input u to be inputted to a controlled object based on the desired value r and the control output y;
calculating, based on the time-series data, a value ρ* of a parameter ρ that minimizes a value of an evaluation function J(ρ, θ, um, ym) in a state where a parameter θ is set to a fixed value θ0, the evaluation function J(ρ, θ, um, ym) including a transfer function C(ρ) of the controller and a target response transfer function Td(θ), the transfer function C(ρ) including the parameter ρ, the target response transfer function Td(θ) defining a target response yr corresponding to the desired value r, the target response transfer function Td(θ) including the parameter θ, the evaluation function J(ρ, θ, um, ym) being for evaluating an error between the target response yr and the control output ym;

calculating a value $\theta^*$ of the parameter $\theta$ that minimizes the value of the evaluation function $J(\rho, \theta, um, ym)$ in a state where the parameter $\rho$ is set to the value $\rho^*$; and calculating a prediction value up of the control input u and a prediction value yp of the control output y corresponding to the desired value r, based on a transfer function $C(\rho^*)$ in which the parameter $\rho$ is set to the value $\rho^*$ and on a target response transfer function $Td(\theta^*)$ in which the parameter $\theta$ is set to the value $\theta^*$.

\* \* \* \* \*